(12) United States Patent
Reznic

(10) Patent No.: US 10,820,003 B2
(45) Date of Patent: Oct. 27, 2020

(54) SYSTEM, APPARATUS, AND METHOD OF WI-FI VIDEO TRANSMISSION UTILIZING LINEAR MAPPING OF TRANSMISSION PAYLOAD INTO CONSTELLATION POINTS

(71) Applicant: Amimon Ltd., Ra'anana (IL)

(72) Inventor: Zvi Reznic, Tel Aviv (IL)

(73) Assignee: AMIMON LTD., Ra'anana (IL)

( * ) Notice: Subject to any disclaimer, the term of this patent is extended or adjusted under 35 U.S.C. 154(b) by 0 days.

(21) Appl. No.: 16/477,197

(22) PCT Filed: Dec. 18, 2017

(86) PCT No.: PCT/IB2017/058059
§ 371 (c)(1),
(2) Date: Jul. 11, 2019

(87) PCT Pub. No.: WO2018/158628
PCT Pub. Date: Sep. 7, 2018

(65) Prior Publication Data
US 2019/0379900 A1    Dec. 12, 2019

Related U.S. Application Data

(60) Provisional application No. 62/465,291, filed on Mar. 1, 2017, provisional application No. 62/468,962, filed on Mar. 9, 2017, provisional application No. 62/472,587, filed on Mar. 17, 2017.

(51) Int. Cl.
| H04N 11/02 | (2006.01) |
| H04N 19/48 | (2014.01) |
| H04N 19/13 | (2014.01) |
| H04L 29/06 | (2006.01) |

(52) U.S. Cl.
CPC ......... *H04N 19/48* (2014.11); *H04L 65/602* (2013.01); *H04L 65/604* (2013.01); *H04N 19/13* (2014.11)

(58) Field of Classification Search
CPC ..................................... H04N 19/48
USPC ....................... 375/240.01–240.29
See application file for complete search history.

(56) References Cited

U.S. PATENT DOCUMENTS

| 4,745,473 | A | * | 5/1988 | Hall | H04N 19/90 348/396.1 |
| 5,260,971 | A | * | 11/1993 | Cole | H03M 13/25 375/254 |
| 6,058,307 | A | * | 5/2000 | Garner | |
| 7,095,707 | B2 | * | 8/2006 | Rakib | H03M 13/256 348/E7.07 |
| 2005/0047323 | A1 | * | 3/2005 | Clarkson | H04L 27/2627 370/203 |

(Continued)

OTHER PUBLICATIONS

International Search Report (ISR) in PCT/IB2017/058059, dated Apr. 24, 2018.

(Continued)

*Primary Examiner* — Leron Beck
(74) *Attorney, Agent, or Firm* — Eitan Mehulal Sadot

(57) ABSTRACT

A system for wireless video transmission includes a video compression unit to generate a description of DCT taps, a linear mapper to generate transmission payload from the DCT taps, and a wireless transmitter to map the transmission payload into constellation points, wherein the real part and the imaginary part of each of the constellation points is a monotonic function of some of the DCT taps.

8 Claims, 6 Drawing Sheets

(56) References Cited

U.S. PATENT DOCUMENTS

| | | | |
|---|---|---|---|
| 2005/0069329 A1* | 3/2005 | Giles | H04B 10/505 398/188 |
| 2006/0109900 A1* | 5/2006 | Shen | H04N 19/176 375/240.03 |
| 2007/0091999 A1* | 4/2007 | Nissan-Cohen | H04N 19/30 375/240.2 |
| 2007/0297612 A1* | 6/2007 | Feder et al. | |
| 2008/0084854 A1* | 4/2008 | Feder | H04N 21/4122 370/338 |
| 2009/0181628 A1* | 7/2009 | Feder et al. | |
| 2010/0191534 A1* | 7/2010 | Ryu | G10L 19/0017 704/262 |
| 2012/0105729 A1* | 5/2012 | Stopler | H04N 5/38 348/723 |
| 2012/0189047 A1 | 7/2012 | Jiang | |
| 2013/0028271 A1* | 1/2013 | Limberg | H04N 21/6112 370/479 |
| 2014/0294089 A1 | 10/2014 | MacInnis | |
| 2015/0040184 A1* | 2/2015 | Chang et al. | |
| 2015/0207590 A1 | 7/2015 | Oh | |
| 2016/0227218 A1 | 8/2016 | Trudeau | |
| 2016/0286128 A1* | 9/2016 | Zhou | H04N 7/00 |
| 2016/0307602 A1 | 10/2016 | Mertens | |
| 2017/0302972 A1* | 10/2017 | Zhang | H04N 21/6582 |

OTHER PUBLICATIONS

Written Opinion of the International Searching Authority in PCT/IB2017/058059, dated Apr. 24, 2018.

* cited by examiner

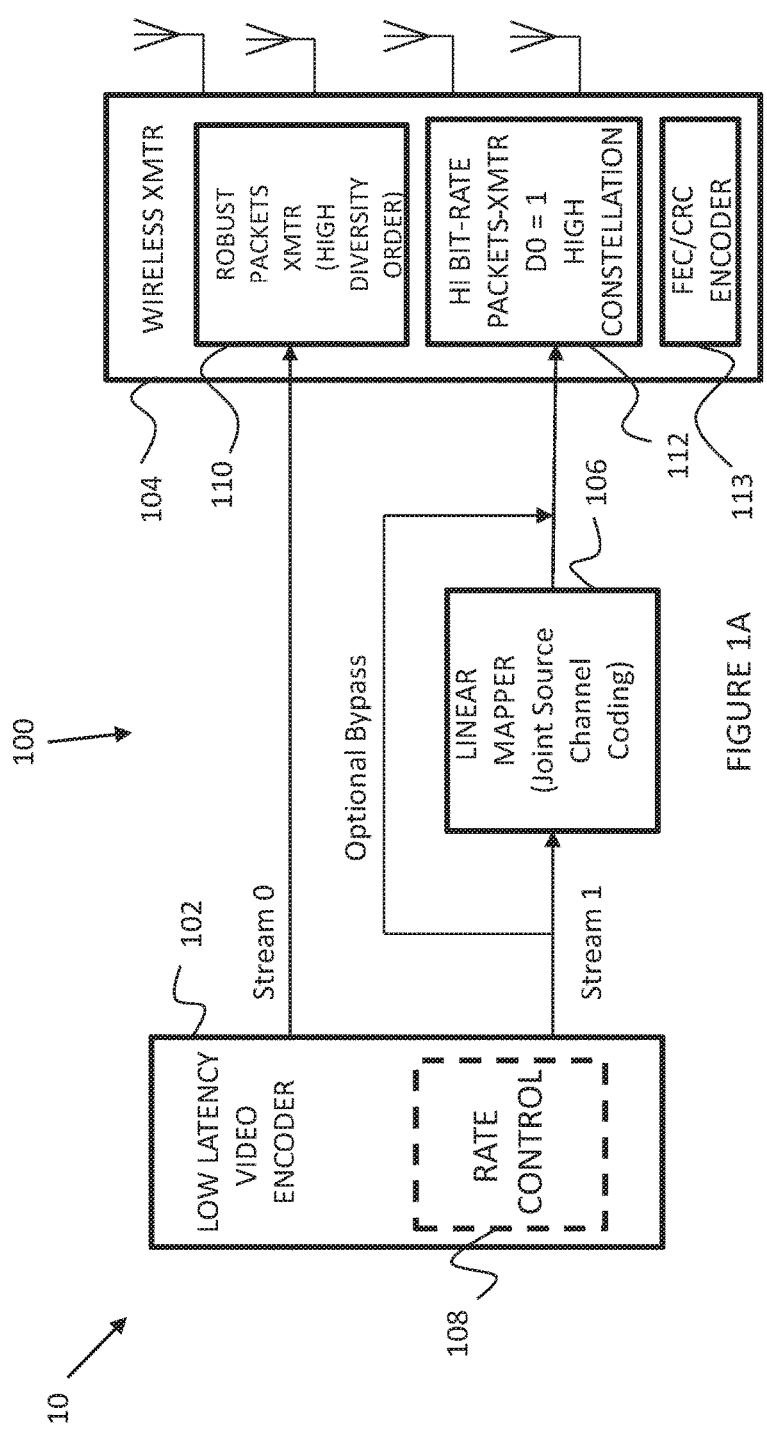
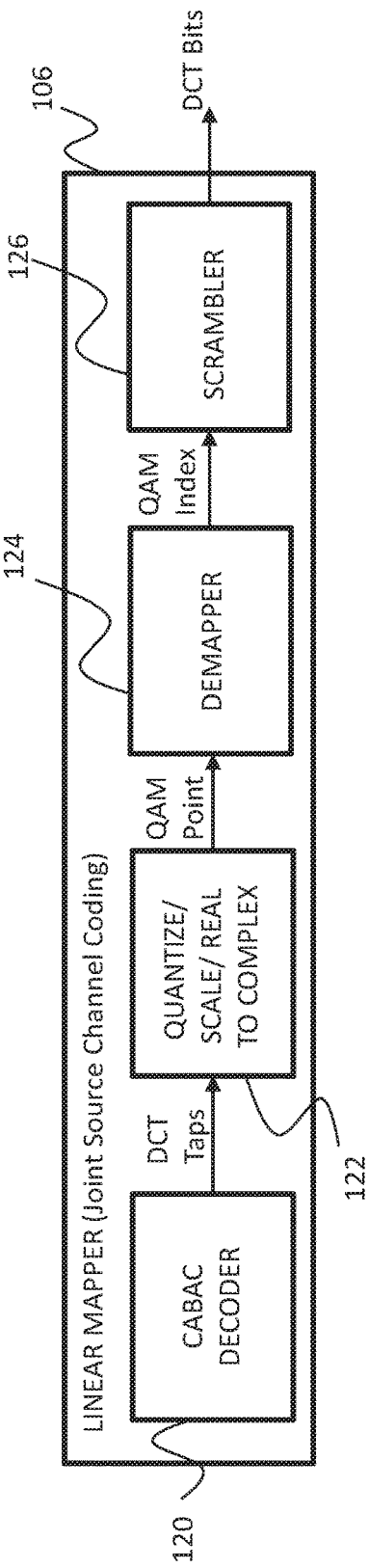
FIGURE 1A
FIGURE 1B

SYSTEM, APPARATUS, AND METHOD OF WI-FI VIDEO TRANSMISSION UTILIZING LINEAR MAPPING OF TRANSMISSION PAYLOAD INTO CONSTELLATION POINTS

CROSS-REFERENCE TO RELATED APPLICATIONS

This application is a National Stage of PCT international application serial number PCT/IB2017/058059, having an international filing date of 18 Dec. 2017, which is hereby incorporated by reference in its entirety; which claims priority and benefit (a) from U.S. Provisional Patent Application No. 62/465,291, filed 1 Mar. 2017, and (b) from U.S. Provisional Patent Application No. 62/468,962, filed 9 Mar. 2017, and (c) from U.S. Provisional Patent Application No. 62/472,587, filed 17 Mar. 2017, all of which are hereby incorporated in their entirety by reference.

FIELD OF THE INVENTION

The present invention relates to wireless communications generally, and to a system for wireless transmission of video more particularly.

BACKGROUND OF THE INVENTION

In some video applications such as, for example, VR (Virtual Reality), AR (Augmented Reality) and MR (Mixed Reality), there may be a need to wirelessly transmit raw video. In many cases, the video may be generated in an uncompressed manner (e.g. by a GPU or by a camera) such that the input to the wireless system at one end may consist of pixels and the output of the system at the other end may be a reproduction of the input pixels.

These wireless systems should generally provide for relatively high quality where the output pixels are as similar as possible to the input pixels. The systems should additionally provide for relatively low latency where the total delay of the transmission is low, and for relatively high robustness to reduce the probability of interruption or severe degradation on the displayed video at the receiver side.

In an attempt to provide these characteristics, the systems are generally configured to include a video encoder and a wireless transmitter. The video encoder is generally designed to compress the video data prior to transmission over a communication network. It may allow for a reduction in transmission bandwidth and in transmission time. The video encoder may be based on a known compression standard such as, for example, H.264 or H.265. The wireless transmitter may transmit the compressed video data as packets. The wireless transmitter may include a modem which may be based on a known communication standard such as, for example, WiFi, LTE of 5G cellular network.

SUMMARY OF THE PRESENT INVENTION

There is provided, in accordance with an embodiment of the present invention, a system for wireless video transmission including a video compression unit to generate a description of Discrete Cosine Transform (DCT) taps (also called DCT coefficients), a linear mapper to generate transmission payload from the DCT taps, and a wireless transmitter to map the transmission payload into constellation points, wherein the real part and the imaginary part of each of the constellation points is a monotonic function of some of the DCT taps.

In some embodiments of the present invention the linear mapper includes a decoder.

In some embodiments of the present invention the linear mapper includes a compander.

In some embodiments of the present invention the linear mapper includes a Hadamard encoder.

In some embodiments of the present invention the linear mapper includes a video-content-dependent scaler.

In some embodiments of the present invention the linear mapper includes a quantizer.

In some embodiments of the present invention the linear mapper includes a DCT taps scaler.

In some embodiments of the present invention the linear mapper includes a demapper.

In some embodiments of the present invention the linear mapper includes a scrambler.

In some embodiments of the present invention the system includes an EOB message creator.

In some embodiments of the present invention the system includes a scaling message creator.

In some embodiments of the present invention the system includes a high robustness bit organizer.

In some embodiments of the present invention the video compression unit includes a low latency encoder.

In some embodiments of the present invention the wireless transmitter includes a standard-complying modem In some embodiments of the present invention the wireless transmitter includes a WiFi modem.

In some embodiments of the present invention the video compression unit includes a standard compression unit.

In some embodiments of the present invention the video compression unit includes an H.264 or H.265 or MPEG compression unit.

In some embodiments of the present invention the video compression unit generates a coarse description and a refinement video description There is provided, in accordance with an embodiment of the present invention, a system for wireless video reception including a wireless receiver to demodulate a received signal into constellation points, wherein the real part and the imaginary part of each of the constellation points is a monotonic function of DCT taps associated with the received signal, a linear demapper to encode the received signal into the DCT taps, and a video decompression unit to convert the DCT taps into video data.

In some embodiments of the present invention the linear demapper includes a descrambler.

In some embodiments of the present invention the linear demapper includes a mapper.

In some embodiments of the present invention the linear demapper includes a de-quantizer.

In some embodiments of the present invention the linear demapper includes an encoder.

In some embodiments of the present invention the video decompression unit includes a low latency decoder.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A schematically illustrates a block diagram of an exemplary video transmission system in a wireless video communication system, according to an embodiment of the present invention;

FIG. 1B schematically illustrates the linear mapper in the video transmission system of FIG. 1A, according to an embodiment of the present invention;

Figure 2A:
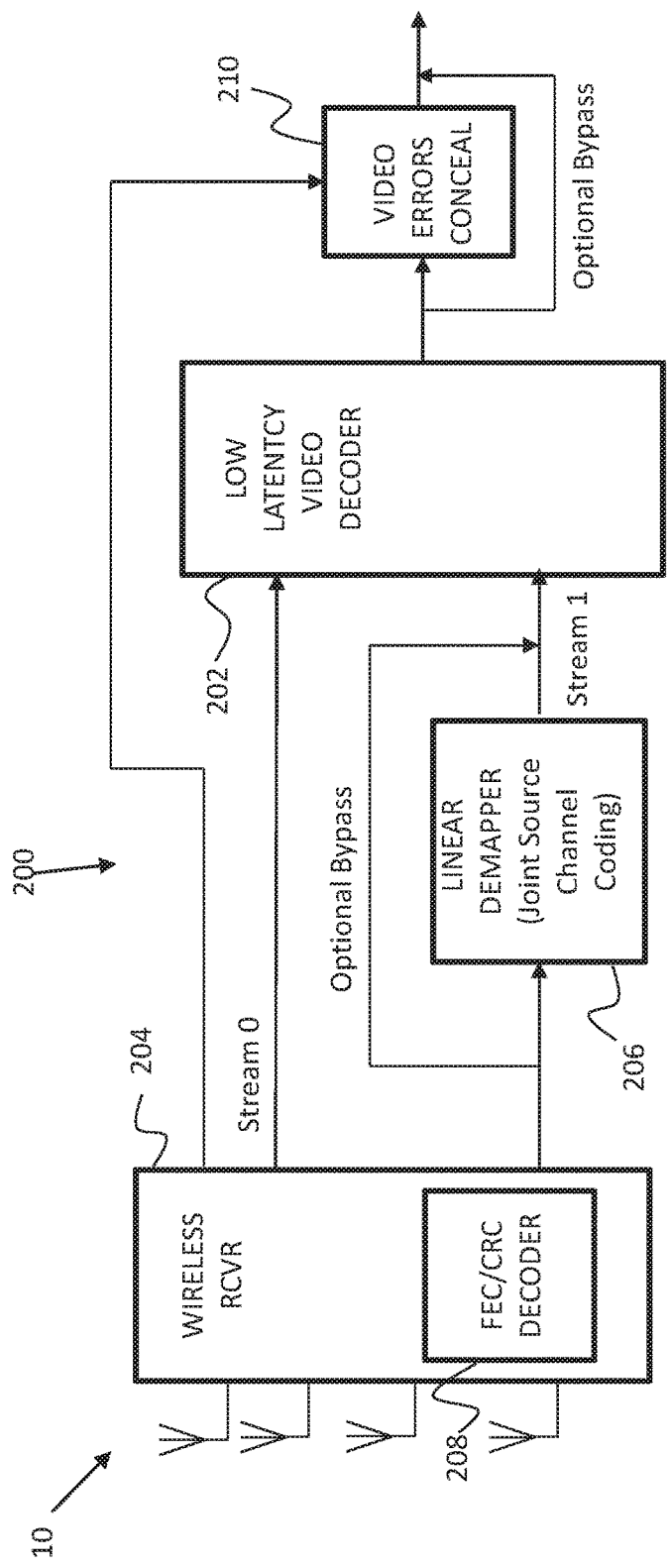
FIG. 2A schematically illustrates a block diagram of an exemplary video reception system in a wireless video communication system, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that a simple glueless connection of a standard video compression unit (video encoder) with a standard wireless transmitter such as modem may lead to un-satisfactory performance in terms of video quality, latency and/or robustness. Applicants have further realized that high quality, low latency robust wireless transmission of video using standard video compression units and standard wireless transmitters may be achieved by including in the system a linear mapper suitably integrated with an appropriate video compression unit and an appropriate transmitter.

Applicants have additionally realized that such a system may include a video compression unit which may divide the video data into two compressed streams, a first stream which may include a coarse description of the video data and a second stream which may provide a refined description of the video data. Both the first and the second compressed stream may include DCT taps. In the system, the first stream, due to the robustness of its transmission scheme, may be transferred from the video compression unit to the wireless transmitter with relatively minimum processing them. The second stream may be processed by the linear mapper which may generate DCT bits (from the DCT taps) for use in transmission payloads to be transmitted by the wireless transmitter. The wireless transmitter may map the transmission payload using a high constellation to achieve high bit-rate transmissions.

In exemplary embodiments, the linear mapper may include different configurations as shown in the figures. Nevertheless, the skilled person may appreciate that other configurations may be used for the linear mapper, some of which may include the same functional blocks arranged in the same order as shown in the figures, or in a different order, and may additionally or alternatively include different functional blocks.

Reference is made to FIG. 1A which schematically illustrates a block diagram of an exemplary video transmission system 100 in a wireless video communication system 10, according to an embodiment of the present invention. Video transmission system 100 includes a low latency video encoder 102, a wireless transmitter 104, and a linear mapper for compressed video 106.

Low latency video encoder 102 may receive video pixels from a video source (not shown), may compresses the video, and may generate one or more compressed streams, for example, Stream 0 and Stream 1 as shown. In compressing the video and generating the compressed streams, low latency video encoder 102 may perform inter-frame prediction, intra-frame prediction, and/or other types of video frame prediction. The difference between the predicted block and the input block is generally referred to as the prediction error or the Residue.

Low latency video encoder 102 may additionally perform 2-dimensional DCT (Discrete Cosine Transform) operations or other suitable transform operations to transform video from the spatial and optionally temporal domain to the frequency domain. The DCT operation may be performed on the input block, the predicted block, and/or on the Residue.

Low latency video encoder 102 may additionally perform any one or more of quantization, pre-processing, Chroma decimation, skipped blocks, in-loop filtering and entropy coding. The entropy coding may include fixed-length and variable-length coding, Exp-Golomb codes, Context-Adaptive-Variable-Length-Coding (CAVLC), and Context-Adaptive-Binary-Arithmetic-Coding (CABAC), among other suitable entropy coding techniques. In the figure, video transmission system 100 is shown using CABAC encoding. Alternatively, low latency video encoder 102 may not include any entropy coding.

Low latency video encoder 102 may additionally perform scalable-video-coding in generating the two compressed streams. Stream 0 may include a coarse description of the video source and Stream 1 may include a refinement description, so that the two streams combined can be used as a fine description of the video source. Optionally, more than two levels of coding may be used. As shown in the figure, Stream 0 may be directly passed to wireless transmitter 104 for transmission. Stream 1 may be passed to linear mapper 106 prior to transmission. Liner mapper 106, which is described in greater detail below, may be a separate module as shown in the figure or integrated into low latency video encoder 102.

Low latency video encoder 102 may optionally include a rate control module 108. Rate control module 108 may estimate the video bitrate based on video characteristics such as energy of the non-DC DCT taps, or on video bitrate of previous frames, and may adjust the bit rate of Stream 0 and Stream 1 accordingly.

In some embodiments, low latency video encoder 102 may be standard-compliant. For example it may comply with MPEG-2, H.264, H.265, H.264-SVC, H.265-SVC, among other standards.

Reference is now also made to FIG. 1B which schematically illustrates the linear mapper 106 in video transmission system 100, according to an embodiment of the present invention. Linear mapper 106 may include a decoder 120, a quantize/scale/real-complex module 122, a demapper 124, and an optional scrambler 126. Linear mapper 106 may process the video in Stream 1 and may generate DCT bits and control bits for transmission by wireless transmitter 104.

Decoder 120 may include the ability to decode the specific bit stream as encoded by in stream 1 by the low latency video encoder 102. Decoder 120 may include a CABAC decoder. The linear decoder may additionally or alternatively include other types of entropy decoders. It may also include other decoders and parsers to allow the DCT taps encoded by the video encoder to be decoded and make them available for further processing by linear mapper 106.

Quantize/scale/real-complex module 122 may scale the DCT taps from CABAC decoder 120, which may be represented by real numbers, and may group them into pairs of two DCT taps, where each pair may be used to create a complex Quadrature Amplitude Modulation (QAM) point. One DCT tap of the pair may be used as the real value and the second DCT tap of the pair as the imaginary value of the QAM point.

Quantize/scale/real-complex module 122 may additionally quantize the DCT taps. For example, if a DCT tap is represented by an 11-bit number and it is desired that the QAM point be from a grid of 1024 QAM, then each DCT tap may be quantized to 5 bits (one of 32 possible values), such that the total number of possible QAM points will be $32*32=2^5+5=1024$. The constellation size (e.g. 1024QAM) at the output of the Quantize/scale/real-complex module 122 may be identical to the constellation size the high bit-rate packets 112 in the wireless transmitter 104.

Demapper 124 may include a QAM demapper which may map the QAM points to bits. For example, a 1024 QAM point may be mapped to $\log_2 1024=10$ bits. The Scrambler 126 may be optional and may be substantially identical to a bit scrambler in wireless transmitter 104 if the transmitter uses a bit scrambler. Use of scrambler 126 being substantially identical to the bit scrambler in wireless transmitter 104 may enable the scramblers to cancel each other.

Wireless transmitter 104 may transmit the data associated with the video in Stream 0 and in Stream 1 using wireless communications, and may include a robust packet transmitter module 110, a high bit-rate packet transmitter module 112, and a FEC encoder 113. Optionally, wireless transmitter 104 may be a wireless modem. One or more techniques may be used to ensure the robustness of the transmission of Stream 0. For example, techniques such as space-time-coding, high diversity order, relatively lower constellations, Forward-Error-Correction (FEC) and nested codes with interleavers between them may be used.

Wireless transmitter 104 may generate constellation points (when transmitting packets of payload received from linear mapper 104) substantially the same as the quantized QAM points generated by linear mapper 106.

Robust packet module 110 may be used to generate the robust packets which carry the information in Stream 0. One or more techniques may be used to ensure the robustness of the transmission of Stream 0. For example, techniques such as space-time-coding, high diversity order, relatively lower constellations, Forward-Error-Correction (FEC) and nested codes with interleavers between them may be used High bit-rate packets transmitter module 112 may generate the packets which may include the DCT bits and control bits generated by linear mapper 106 from Stream 1. Optionally, the control bits are included in the robust packets associated with Stream 0. The bits that represent the DCT taps (at the output of linear mapper 106) may be transmitted using high bit-rate transmissions. High bit-rate transmissions may be achieved by the use of high constellations (e.g. 1024 QAM or 256 QAM), high FEC rate (e.g. rate of 1 or 5/6), high number of spatial streams (e.g. 3 spatial streams for a 3 antenna transmitter), by avoiding the use of low-rate space-time-codes, among other techniques associated with high bit rate transmissions.

FEC encoder 113 may be systematic, that is, the output of the FEC encoder may include a concatenation of the original un-coded data, and the redundancy data. When using systematic codes, the receiver 204 may chose to ignore the redundancy data. Alternatively, it may choose to first decode the code words properly, but in case of failure, to ignore the redundancy data and use only the remaining part.

In some embodiments, wireless transmitter 104 may be standard-compliant. For example, it may comply with IEEE 802.11ax or IEEE 802.11ac or Wi-Fi, or LTE, or 5G among other known standards.

Reference is made to FIG. 2A which schematically illustrates a block diagram of an exemplary video reception system 200 in wireless video communication system 10, according to an embodiment of the present invention. Video reception system 200 includes a low latency video decoder 202, a wireless receiver 204, and a linear demapper for compressed video 206.

Figure 2B:
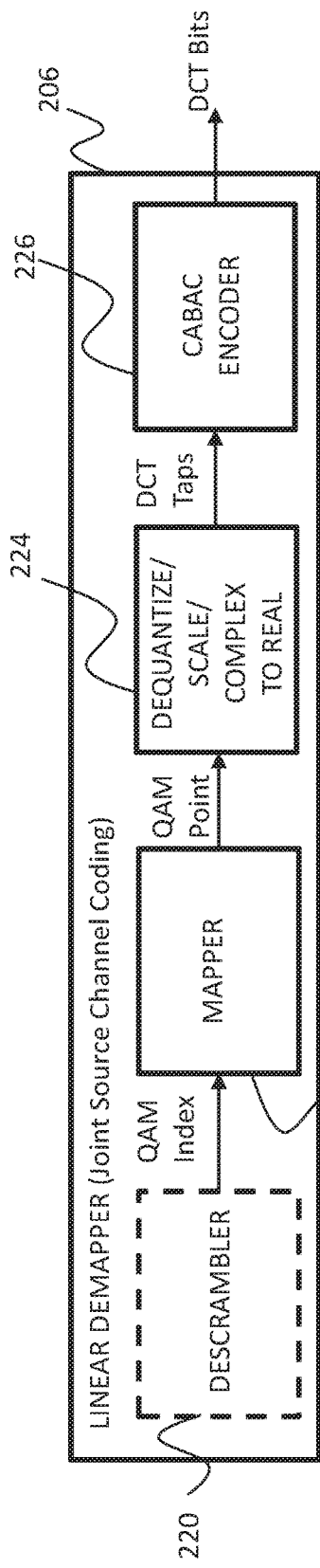
FIG. 2B schematically illustrates a linear demapper in the video reception system of FIG. 2A, according to an embodiment of the present invention.

Reference is also made to FIG. 2B which schematically illustrates linear demapper 206 in video reception system 200, according to an embodiment of the present invention. Linear demapper 206 may include an optional descrambler 220, a mapper 222, a de-quantize/scale/complex-real module 224, and a decoder 226.

The wireless receiver 204 may include measures such as CRC that may indicate the presence of errors in the decoded data. Wireless receiver 204 may then ignore such indications (e.g. ignore the presence of "bad CRC") and output the decoded data anyway.

An explanation of the various components in video reception system 200 and their operation is not provided herein beyond that shown in FIGS. 2A and 2B. Nevertheless, the skilled person made readily appreciate that the video reception system components shown and their operation is to process the video transmissions received from video transmission system 100.

Figure 3:
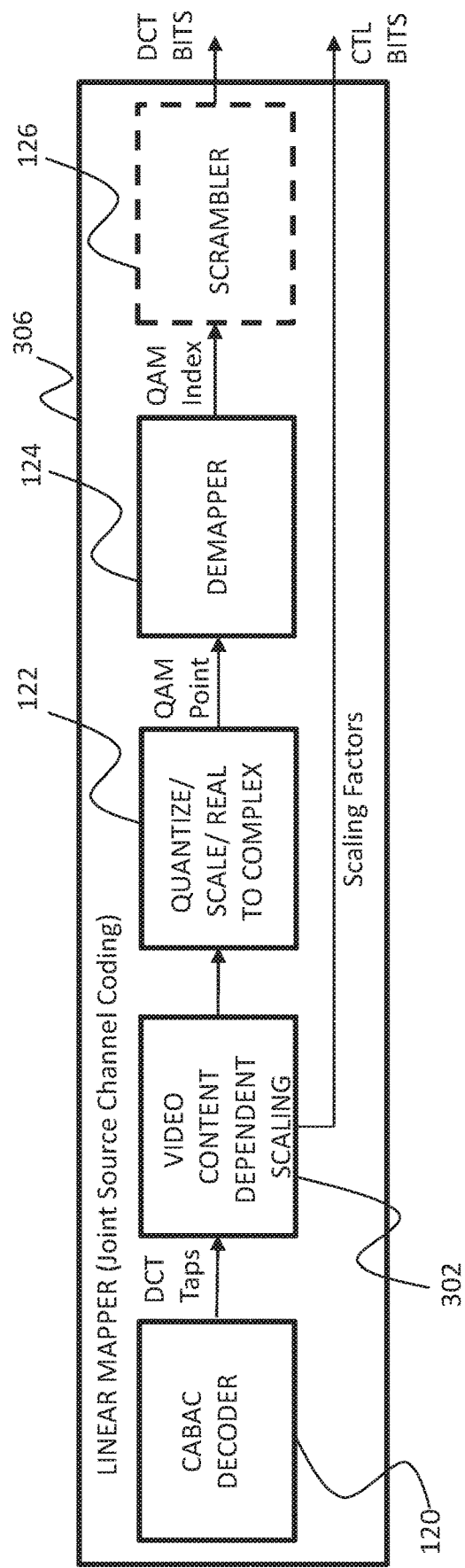
FIG. 3 schematically illustrates a detailed block diagram of an exemplary linear mapper for use in the video transmission system of FIG. 1A, according to an embodiment of the present invention.

Reference is now made to FIG. 3 which schematically illustrates a detailed block diagram of an exemplary linear mapper 306 for use in video transmission system 100, according to an embodiment of the present invention. Linear mapper 306 may include similar functions to that in linear mapper 106 of FIG. 1B and/or may include modifications thereto as may be required to provide the functional capabilities described herein with reference to FIG. 3. Linear mapper 306 may include CABAC decoder 120, a video-content-dependent scaler 302, quantize/scale/real-complex module 122, demapper 124, and optional scrambler 126.

CABAC decoder 120 may be replaced by any other suitable entropy decoder, and may also include other decoders and parsers such that the DCT taps encoded by the video encoder may be decoded and available for further processing by linear mapper 306.

Video-content-dependent scaler 302 may scale the DCT taps (real numbers). In some embodiments, video-content-dependent scalar 302 may group the DCT blocks into super blocks which may contain a large number of DCT blocks (e.g. 240 blocks). Video-content-dependent scalar 302 may calculate the total energy (the sum of square values) of all the DCT taps in the super block, and may determine the scaling factor based on the total energy. Alternatively, it may calculate the total energy of a certain subset of the DCT taps in the superblock and may determine the scaling factor based on the total energy in that subset. It may then apply the chosen scaling factor to all the DCT taps. In some embodiments video-content-dependent scaler 302 may be a CFP (Constant Fine Power). In CFP, the scaling factor is chosen according to the total energy of the DCT taps in the superblock, such that the total energy of all the superblocks after the scaling will remain substantially constant. The scaling factor might be quantized, such that it can be described efficiently with small number of bits.

Video-content-dependent scaler 302 may also generate a message to the receiver which may include the scaling factor that was used. The message with the scaling factor may be added to Stream 0 as control bits (CTL), and transmitted wirelessly using the robust packets. In some embodiments, video-content-dependent scaler 302 may be bypassed, in which case, its output will equal its input.

As previously described with relation to the linear mapper of FIG. 1, the real values at the output of video-content-dependent scaler 302 may be grouped into pairs of two scaled DCT taps by quantize/scale/real-complex module 122. Each pair of scaled DCT may be used to create the complex QAM point, one scaled-DCT tap of the pair may be used as the real value and the second scaled-DCT tap of the pair as the imaginary value. The scaled-DCT taps may also be quantized by quantize/scale/real-complex module 122, as previously described with regards to FIG. 1. The QAM point may then be processed by demapper 124 which may map the QAM point to bits, also as previously described with relation to FIG. 1.

Similar to the linear mapper of FIG. 1, if the wireless transmitter includes a bit scrambler, use of this scrambler may be compensated by adding substantially identical scrambler 126 in linear mapper 306 so that the two scramblers may cancel each other.

Figure 4:
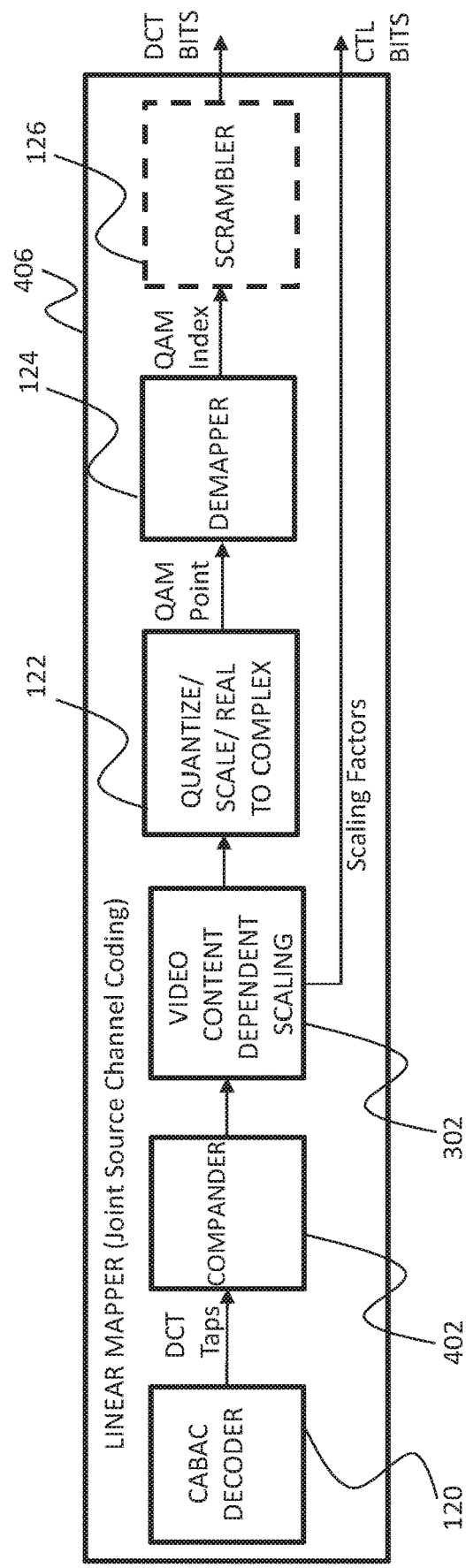
FIG. 4 schematically illustrates a detailed block diagram of an exemplary linear mapper for use in the video transmission system of FIG. 1A, according to an embodiment of the present invention.

Reference is now made to FIG. 4 which schematically illustrates a detailed block diagram of an exemplary linear mapper 406 for use in video transmission system 100, according to an embodiment of the present invention. Linear mapper 406 may include similar functions to that in linear mapper 306 of FIG. 3 and/or may include modifications thereto as may be required to provide the functional capabilities described herein with reference to FIG. 4. Linear mapper 406 may include CABAC decoder 120, a compander 402, video content scaler 302, quantize/scale/real-complex module 122, demapper 124, and optional scrambler 126.

As previously described with reference to FIG. 3, CABAC decoder 120 may be replaced by any other suitable entropy decoder, and may also include other decoders and parsers such that the DCT taps encoded by the video encoder may be decoded and available for further processing by linear mapper 406.

Compander 402 may compound the DCT taps which may include use of a non-linear monotonic function, prior to further processing and QAM mapping. For example, compander 402 may implement the following function:

$$Y = \begin{cases} \alpha X & \text{if } |X| \leq T \\ \text{sign}(X) \cdot (\alpha T + \beta(|X| - T)) & \text{if } |X| > T \end{cases}$$

where X is the compander input, Y is the compander output, and $\alpha, \beta, T$ are some positive constants where $\alpha > \beta$. In some embodiments, compander 402 may be bypassed, in which case its output will equal its input.

The compander 402 may implement other function which gives higher gain to low-amplitude inputs and lower gains to high amplitude inputs.

In some embodiments, the compander output values (real numbers) may be scaled by video-content-dependent scalar 302, as previously described with reference to FIG. 3. The real values at the output of video-content-dependent scaler 302 may then be grouped into pairs of two scaled scaled-compander-output in quantize/scale/real-complex module 122, as previously described with reference to the earlier figures. Each pair may be used to create a complex QAM point, by using one scaled-compander-output tap of the pair as the real value and the second scaled-compander-output tap of the pair as the imaginary value. The scaled-compander-output taps may also be quantized in quantize/scale/real-complex module 122, as previously described with reference to FIGS. 1B and 3. The QAM point may then be processed by demapper 124 which maps the QAM point to bits, also as previously described with relation to the mentioned figures.

Similar to the linear mapper of FIGS. 1B and 3, if the wireless transmitter includes a bit scrambler, use of this scrambler may be compensated by adding substantially identical scrambler 126 in linear mapper 402, so that the two scramblers may cancel each other.

Figure 5:
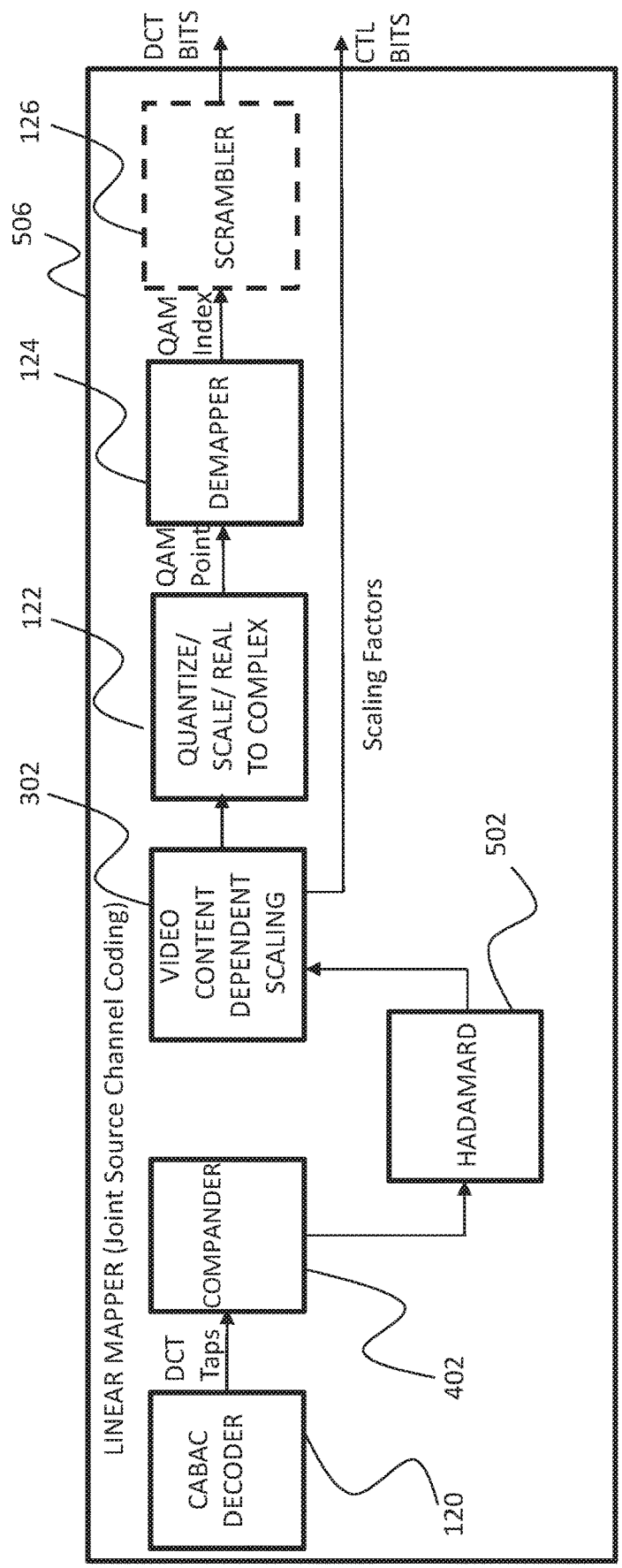
FIG. 5 schematically illustrates a detailed block diagram of an exemplary linear mapper for use in the video transmission system of FIG. 1A, according to an embodiment of the present invention.

Reference is now made to FIG. 5 which schematically illustrates a detailed block diagram of an exemplary linear mapper 506 for use in video transmission system 100, according to an embodiment of the present invention. Linear mapper 506 may include similar functions to that in linear mapper 406 of FIG. 4 and/or may include modifications thereto as may be required to provide the functional capabilities described herein with reference to FIG. 5. Linear mapper 506 may include CABAC decoder 120, compander 402, a Hadamard encoder 502, video content scaler 302, quantize/scale/real-complex module 122, demapper 124, and optional scrambler 126.

As previously described with reference to the earlier figures, CABAC decoder 120 may be replaced by any other suitable entropy decoder, and may also include other decoders and parsers such that the DCT taps encoded by the video encoder may be decoded and available for further processing by linear mapper 506.

In some embodiments, as previously described with reference to the linear mapper of FIG. 4, the DCT taps may undergo a compander operation in compander 402.

Hadamard encoder 502 may process the output of compander 402 processed by segmenting it to vectors of N compander output values and multiplying each group by a N×N Hadamard matrix or other suitable matrix in. The matrix size can also be N×M where M>N to create redundancy. Alternatively, another function may be used to mix groups of compander output values.

In some embodiments, the Hadamard output values, which are real numbers, may then be scaled by videocontent-dependent scaler 302, as described with reference to the earlier figures. The real values at the output of video-content-dependent scaler 302 may then be grouped into pairs of two scaled-Hadamard-output taps in quantize/scale/real-complex module 122, as also previously described with reference to the earlier figures. Each pair may be used to create a complex QAM point, by using one scaled-Hadamard-output tap of the pair as the real value and the second scaled-Hadamard-output tap of the pair as the imaginary value. The scaled-Hadamard-output taps may also be quantized in quantize/scale/real-complex module 122, as also previously described with reference to the earlier figures. The QAM point may then be processed by demapper 124, also as previously described. In some embodiments, the order of the Hadamard operation and the video-content-dependent-scaler operation may be interchanged.

Similar to the linear mapper of the previous figures, if the wireless transmitter includes a bit scrambler, use of this scrambler may be compensated by adding substantially identical scrambler 126 in linear mapper 506 so that the two scramblers may cancel each other.

Figure 6:
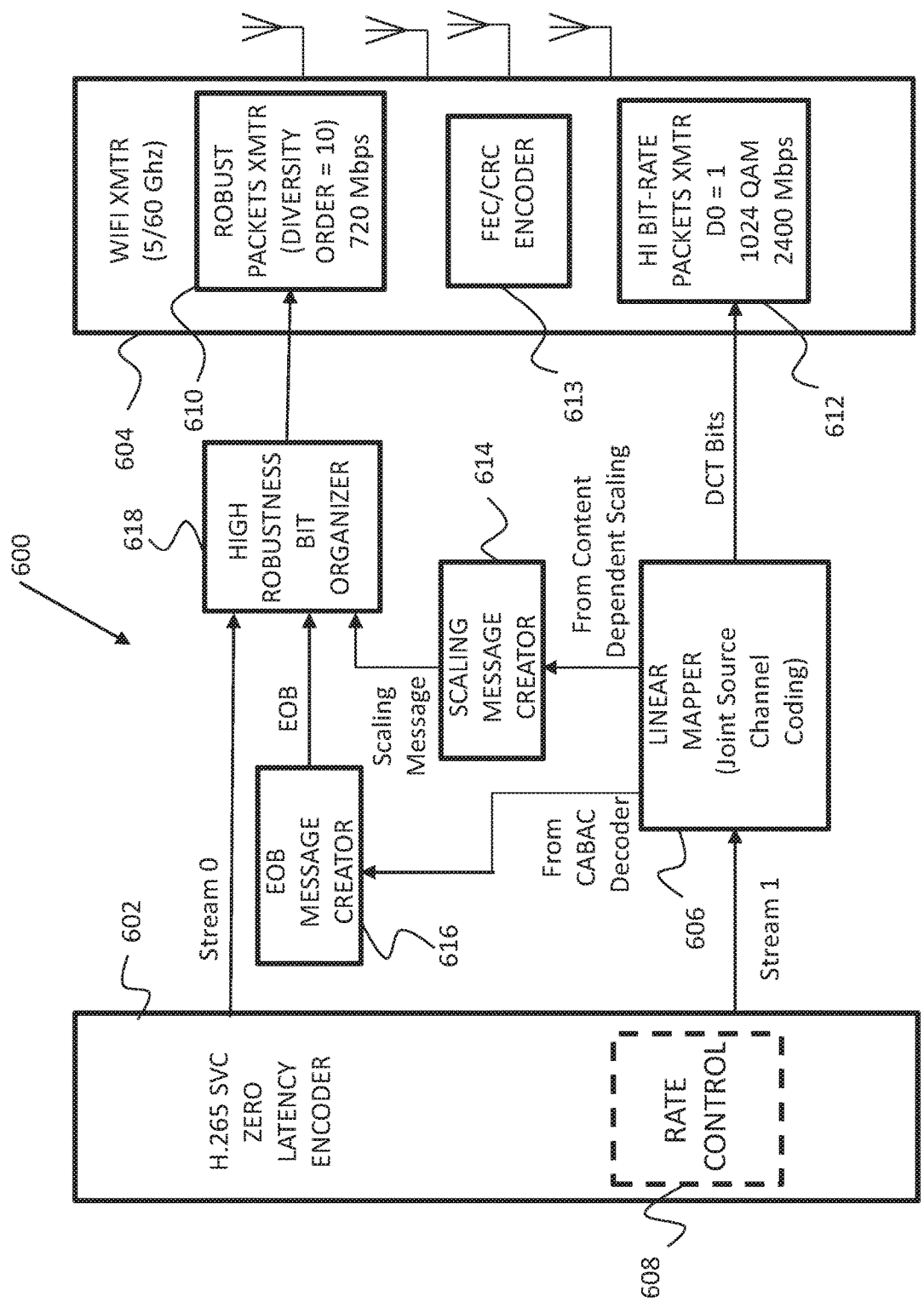
FIG. 6 schematically illustrates a block diagram of an exemplary high-robustness, wireless video transmission system including a linear mapper for compressed video, according to an embodiment of the present invention.

Reference is now made to FIG. 6 which schematically illustrates a block diagram of an exemplary high-robustness, wireless video transmission system 600 including a linear mapper for compressed video 606, according to an embodiment of the present invention. Video transmission system 600 may include a low latency video encoder 602, a wireless transmitter 604, and linear mapper 606, all of which may include functional characteristics similar to the encoder, transmitter, and line mapper described with reference to FIGS. 1A-5 and/or may include modifications thereto as may be required to provide the functional capabilities described herein with reference to FIG. 6. As shown in FIG. 6, for exemplary purposes, high-robustness video transmission system 602 may include a H.265 SVC zero latency encoder, a WIFI transmitter (5/60 GHz) 604, and linear mapper 606 which may include the functional blocks shown in linear mapper 506 of FIG. 5.

H.265 SVC zero latency encoder 602 may include a rate control module 608 which may be functionally similar to rate control module 108 in FIG. 1A. WIFI transmitter 604 may include a robust packets module 610, a hi bit-rate packets module 612, and an FEC/CRC encoder 613, all of which may be functionally similar to robust packets module 110, hi bit-rate packets module 112, and FEC/CRC encoder 113, in FIG. 1A, respectively, and/or may include respective modifications thereto as may be required to provide the functional capabilities described herein with reference to FIG. 6.

High-robustness video transmission system 600 may include an End-Of-Block (EOB) message creator 616 which may process EOB information associated with Stream 1 and may generate EOB messages for transmission together with the information in Stream 0. The EOB information may include an indication of the last non-zero DCT tap in each of the DCT blocks in the compressed stream (Stream 1). EOB message creator 616 may change the value of the EOB information and generate the EOB message to conform to the bandwidth for transmission.

Transmission of the EOB messages combined with the coarser information in Stream 0 may be potentially advantageous as a more robust transmission method is used compared to the transmission method used for the information of Stream 1. The more robust transmission method may include transmitting the combined information (EOB message and Stream 0) in "robust packets" at a lower bit rate (BR) and using an increased diversity order (DO) compared to the transmission of the packets including the information of Stream 1 ("high BR packets"). For example, referring to FIG. 6, the more robust transmission method may include use of a BR of approximately 720 Mbps and DO of 10 for the combined information, compared to a BR of approximately 2400 Mbps and DO of 1 for Stream 1.

High-robustness video transmission system 600 may also include a scaling message creator 614 which may process scaling information from the content dependent scaler 302 (see FIG. 5) in linear mapper 606 and may generate a scaling message which may also be transmitted together with the combined information (EOB message and Stream 0) in the robust packets. Transmission of the scaling message together with the EOB message and Stream 0 may provide for a further increase in transmission robustness. In some embodiments, other sensitive information associated with Stream 1 may be additionally combined with the information transmitted with Stream 0 (EOB message and optionally scaling message) in the robust packets for further increased robustness. A Hi-robustness bit organizer may combine the message(s) and the information in Stream 0.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for video encoding, linear mapping, and Wi-Fi video transmission over a Wi-Fi communication link, the system comprising:

(A) a video encoder, to receive a video from a video source, to perform scalable video coding, and to generate at least two compressed streams which comprise: (i) a first compressed video stream which comprises a coarse description of said video, and (ii) a second compressed video stream which comprises a fine description of said video;

(B) a Wi-Fi transmitter unit, which is capable of operating (I) as a robust packet transmission Wi-Fi module, and (II) as a high bit-rate packet transmission Wi-Fi module;
wherein at least some packets of encoded video that were encoded by the video encoder are transmitted by the Wi-Fi transmitter unit operating as a robust packet transmission Wi-Fi module;
wherein at least some other packets of encoded video that were encoded by the video encoder are transmitted by the Wi-Fi transmitter unit operating as a high bit-rate packet transmission Wi-Fi module;
wherein the Wi-Fi transmitter unit comprises a Wi-Fi Bit Scrambler Module, to perform bit scrambling operations within said Wi-Fi transmitter unit;

(C) a linear mapper which is a separate unit from said Wi-Fi transmitter unit;
wherein the first compressed video stream which comprises said coarse description of said video, is passed from said video encoder to said Wi-Fi transmitter unit for performing robust packet Wi-Fi transmission; wherein said Wi-Fi transmitter, operating as robust packet transmission Wi-Fi module, generates from said first compressed video stream, robust packets which carry said coarse description of said video;
wherein the second compressed video stream which comprises the fine description of said video, is passed from said video encoder to said linear mapper, wherein output of said linear mapper is then passed from said linear mapper to said Wi-Fi transmitter unit operating as high bit-rate packet transmission Wi-Fi module;
wherein said linear mapper comprises:

(C1) a Context-Adaptive-Binary-Arithmetic-Coding (CABAC) or Context-Adaptive-Variable-Length-Coding (CAVLC) decoder, to decode a bitstream of the second compressed video stream which comprises the fine description of said video, and to parse Discrete Cosine Transform (DCT) taps;

(C2) a real/complex module, to receive the DCT taps from the CABAC or CAVLC decoder represented by real numbers, and to generate from them pairs of DCT taps, wherein each pair represents a complex number; wherein in each pair, one DCT tap is a real component of the complex number, and another DCT tap is an imaginary component of the complex number;

(C3) a quantizer module to quantize the DCT taps, from a first bit range to a second, reduced, bit range and to generate complex Quadrature Amplitude Modulation (QAM) constellation points;
wherein output of the quantizer module has constellation size that is identical to a constellation size of a packet of the Wi-Fi transmitter unit operating as high bit-rate packet transmission Wi-Fi module;

(C4) a QAM de-mapper to perform mapping of QAM constellation points, that are outputted by the quantizer module, into bits;

(C5) a Linear Mapper Bit Scrambler, to receive output of the QAM de-mapper, and to perform bit scrambling of said output of the QAM de-mapper;

wherein bit scrambling operations that are performed by the Linear Mapper Bit Scrambler externally to the Wi-Fi transmitter unit, cancel out bit scrambling operations that are performed by the Wi-Fi Bit Scrambler Module within the Wi-Fi transmitter unit.

2. The system of claim 1,
wherein said linear mapper generates DCT tap bits and DCT control bits;
wherein bits that correspond to said DCT tap bits are transmitted over Wi-Fi by the Wi-Fi transmitter unit operating as high bit-rate Wi-Fi transmission module;
wherein bits that correspond to said DCT control bits are transmitted over Wi-Fi by the Wi-Fi transmitter unit operating as robust packet Wi-Fi transmission module.

3. The system of claim 1,
wherein said linear mapper further comprises a Video-Content-Dependent Scaler,
to perform video-content-dependent scaling of said DCT taps,
by grouping a plurality of DCT taps into super-blocks, by determining a total energy of each super-block of DCT taps based on sum of squared values, and by determining a scaling factor based on said total energy of each super-block of DCT taps.

4. The system of claim 1,
wherein said linear mapper further comprises a Video-Content-Dependent Scaler,
to perform video-content-dependent scaling of said DCT taps,
by grouping a plurality of DCT taps into super-blocks, by determining a total energy of each super-block of DCT taps based on sum of squared values, and by determining a scaling factor based on said total energy of each super-block of DCT taps;
wherein said Video-Content-Dependent Scaler applies a Constant Fine Power (CFP) scaling scheme in which the scaling factor is selected according to said total energy while also maintaining a constant total energy post-scaling for all super-blocks of DCT taps.

5. The system of claim 1,
wherein said linear mapper further comprises a Video-Content-Dependent Scaler,
to perform video-content-dependent scaling of said DCT taps,
by grouping a plurality of DCT taps into super-blocks, by determining a total energy of each super-block of DCT taps based on sum of squared values, and by determining a scaling factor based on said total energy of each super-block of DCT taps;
wherein a Scaling Factor Message, which indicates the scaling factor that was used by the Video-Content-Dependent Scaler, is added to said first compressed video stream which comprises said coarse description of said video, and is transmitted by Wi-Fi transmitter unit operating as robust packet transmission Wi-Fi module.

6. The system of claim 1,
wherein said linear mapper further comprises a Compander unit, to compound the DCT taps prior to QAM mapping, via a non-linear monotonic function which provides higher gains to low-amplitude inputs and which provides lower gains to high-amplitude inputs.

7. A method for video encoding, linear mapping, and Wi-Fi video transmission over a Wi-Fi communication link, the method comprising:

(A) at a video encoder, receiving a video from a video source, performing scalable video coding, and generating at least two compressed streams which comprise: (i) a first compressed video stream which comprises a coarse description of said video, and (ii) a second compressed video stream which comprises a fine description of said video;

(B) wherein a Wi-Fi transmitter unit is associated with said video encoder,
wherein the Wi-Fi transmitter unit is capable of operating (I) as a robust packet transmission Wi-Fi module, and (II) as a high bit-rate packet transmission Wi-Fi module;
wherein at least some packets of encoded video that were encoded by the video encoder are transmitted by the Wi-Fi transmitter unit operating as robust packet transmission Wi-Fi module;
wherein at least some other packets of encoded video that were encoded by the video encoder are transmitted by the Wi-Fi transmitter unit operating as high bit-rate packet transmission Wi-Fi module;
wherein the Wi-Fi transmitter unit comprises a Wi-Fi Bit Scrambler Module,
wherein the method comprises: at said Wi-Fi Bit Scrambler Module, performing bit scrambling operations within said Wi-Fi transmitter unit;

(C) wherein a linear mapper is associated with said Wi-Fi transmitter unit,
wherein the linear mapper is a separate unit from said Wi-Fi transmitter unit;
wherein the method further comprises,
passing the first compressed video stream which comprises said coarse description of said video, from said video encoder to said Wi-Fi transmitter unit operating as robust packet transmission Wi-Fi module;
generating, from said first compressed video stream, robust packets which carry said coarse description of said video;
passing the second compressed video stream which comprises the fine description of said video, from said video encoder to said linear mapper, wherein output of said linear mapper is then passed from said linear mapper to the Wi-Fi transmitter operating as high bit-rate packet transmission Wi-Fi module;
wherein the method further comprises, at said linear mapper:

(C1) at a Context-Adaptive-Binary-Arithmetic-Coding (CABAC) or Context-Adaptive-Variable-Length-Coding (CAVLC) decoder, decoding a bitstream of the second compressed video stream which comprises the fine description of said video, and parsing Discrete Cosine Transform (DCT) taps;

(C2) at a real/complex module, receiving the DCT taps from the CABAC or CAVLC decoder represented by real numbers, and generating from them pairs of DCT taps, wherein each pair represents a complex number; wherein in each pair, one DCT tap is a real component of the complex number, and another DCT tap is an imaginary component of the complex number;

(C3) at a quantizer module, performing quantization of the DCT taps, from a first bit range to a second, reduced, bit range and generating complex Quadrature Amplitude Modulation (QAM) constellation points;
wherein output of the quantizer module has constellation size that is identical to a constellation size of a packet of the Wi-Fi transmitter unit operating as high bit-rate packet transmission Wi-Fi module;

(C4) at a QAM de-mapper, performing mapping of QAM constellation points, that are outputted by the quantizer module, into bits;

(C5) at a Linear Mapper Bit Scrambler, receiving output of the QAM de-mapper, and performing bit scrambling of said output of the QAM de-mapper;
wherein bit scrambling operations that are performed by the Linear Mapper Bit Scrambler externally to the Wi-Fi transmitter unit, cancel out bit scrambling operations that are performed by the Wi-Fi Bit Scrambler Module within the Wi-Fi transmitter unit.

8. A Wi-Fi transmission apparatus for video encoding, linear mapping, and Wi-Fi video transmission over a Wi-Fi communication link, the Wi-Fi transmission apparatus comprising:

(A) a video encoder, to receive a video from a video source, to perform scalable video coding, and to generate at least two compressed video streams;

(B) a Wi-Fi transmitter unit, which comprises therein a Wi-Fi Bit Scrambler Module to perform bit scrambling operations within said Wi-Fi transmitter unit;

(C) a linear mapper which is a separate unit from said Wi-Fi transmitter unit and is external to said Wi-Fi transmitter unit,
wherein a first compressed video stream of said video is passed from said encoder to said Wi-Fi transmitter unit;
wherein a second compressed video stream of said video is passed from said video encoder to said linear mapper, wherein output of said linear mapper is then passed from said linear mapper to said Wi-Fi transmitter unit;
wherein said linear mapper is adapted (i) to perform entropy decoding of said second compressed video stream of said video, and (ii) to generate Discrete Cosine Transform (DCT) taps, and (iii) to perform linear mapping of said DCT taps to Quadrature Amplitude Modulation (QAM) constellation points, and (iv) to perform real-to-complex conversion and quantization of values of said QAM constellation points;
wherein said linear mapper comprises a QAM de-mapper, to perform de-mapping of said QAM constellation points into video bits;
wherein said linear mapper comprises a Linear Mapper Bit Scrambler, to receive output of said QAM de-mapper, and to perform bit scrambling of said output of the QAM de-mapper;
wherein bit scrambling operations that are performed by the Linear Mapper Bit Scrambler externally to the Wi-Fi transmitter unit, cancel out bit scrambling operations that are performed by the Wi-Fi Bit Scrambler Module within the Wi-Fi transmitter unit.

* * * * *